US008613008B2

(12) United States Patent
Daniel

(10) Patent No.: US 8,613,008 B2
(45) Date of Patent: Dec. 17, 2013

(54) SYSTEM AND METHOD FOR BROADCASTING MEDIA

(75) Inventor: Isaac Sayo Daniel, Miami, FL (US)

(73) Assignee: Lead Technology Capital Management, LLC

( * ) Notice: Subject to any disclaimer, the term of this patent is extended or adjusted under 35 U.S.C. 154(b) by 601 days.

(21) Appl. No.: 12/689,158

(22) Filed: Jan. 18, 2010

(65) Prior Publication Data

US 2013/0232523 A1   Sep. 5, 2013

Related U.S. Application Data

(63) Continuation-in-part of application No. 12/685,417, filed on Jan. 11, 2010.

(51) Int. Cl.
*H04H 60/56* (2008.01)
*H04H 60/33* (2008.01)
*H04N 7/16* (2011.01)

(52) U.S. Cl.
USPC .............................................. 725/12; 725/10

(58) Field of Classification Search
None
See application file for complete search history.

(56) References Cited

U.S. PATENT DOCUMENTS

| | | | |
|---|---|---|---|
| 5,793,409 A | 8/1998 | Tetsumura | |
| 6,950,534 B2 | 9/2005 | Cohen et al. | |
| 7,134,130 B1 | 11/2006 | Thomas | |
| 8,078,290 B2 | 12/2011 | Nelson | |
| 2002/0083438 A1* | 6/2002 | So et al. | 725/31 |
| 2003/0097563 A1* | 5/2003 | Moroney et al. | 713/170 |
| 2003/0097655 A1* | 5/2003 | Novak | 725/31 |
| 2004/0222047 A1 | 11/2004 | Difranza et al. | |
| 2004/0230993 A1* | 11/2004 | Weinblatt et al. | 725/63 |
| 2004/0261097 A1* | 12/2004 | Hanks | 725/29 |
| 2005/0073576 A1* | 4/2005 | Andreyko et al. | 348/51 |
| 2006/0093998 A1* | 5/2006 | Vertegaal | 434/236 |
| 2006/0136962 A1 | 6/2006 | Masaki | |

(Continued)

OTHER PUBLICATIONS

PCT International Search Report, PCT/US2011/020869, 5 pages, mailed Jul. 18, 2011, European Patent Office, International Searching Authority.

*Primary Examiner* — Brian Pendleton
*Assistant Examiner* — Jonathan V Lewis
(74) *Attorney, Agent, or Firm* — Alberto Interian, III, Esq.

(57) ABSTRACT

A system comprising, at least one processor, at least one eye tracking system electronically connected to the at least one processor, at least one means for electronically connecting a display device to the system, wherein the means for electronically connecting a display device is electronically connected to the at least one processor, and computer executable instructions readable by the at least one processor and operative to use the at least one eye tracking system to determine the number of persons that are capable of viewing at least one display device electronically connected to the system, and control the content displayed on at least one display device connected to the system based on how many persons are determined to be capable of viewing the at least one display device.

A method comprising using at least one processor to perform any or all of the following using at least one sensor to determine a number of persons that are capable of perceiving sensory perceivable content, and controlling the content based on how many persons are determined to be capable of perceiving the content.

A computer readable medium having computer executable instructions for performing a method comprising using at least one eye tracking system to determine a number of persons that are capable of perceiving sensory perceivable content, and controlling the content based on how many persons are determined to be capable of perceiving the content.

20 Claims, 10 Drawing Sheets

(56) References Cited

U.S. PATENT DOCUMENTS

| | | |
|---|---|---|
| 2008/0046930 A1 | 2/2008 | Smith |
| 2008/0134102 A1 | 6/2008 | Movold et al. |
| 2008/0244639 A1 | 10/2008 | Kaaz |
| 2009/0025024 A1* | 1/2009 | Beser et al. ............... 725/12 |
| 2009/0079813 A1 | 3/2009 | Hildreth |
| 2009/0092284 A1 | 4/2009 | Breed et al. |
| 2009/0138805 A1 | 5/2009 | Hildreth |
| 2009/0328089 A1* | 12/2009 | Pradeep et al. ............. 725/12 |
| 2010/0077421 A1* | 3/2010 | Cohen et al. ............... 725/10 |
| 2010/0185341 A1 | 7/2010 | Wilson et al. |

* cited by examiner

SYSTEM AND METHOD FOR BROADCASTING MEDIA

PRIORITY CLAIM

This patent application is a continuation in part of, and claims priority to: U.S. Non-Provisional patent application Ser. No. 12/685,417 titled "System and Method for Broadcasting Media," filed Jan. 11, 2010. The entire disclosures of the afore-mentioned patent application is incorporated by reference as if fully stated herein.

FIELD

The present disclosure relates generally to electronic systems, and more particularly, to systems, methods, and various other disclosures related to broadcasting and playing media.

BACKGROUND

It is common practice for companies to issue site licenses to perceive certain broadcasted programs, such as movies, sports, and the like. Often site licenses contain limitations as to how many persons are allowed to watch the program. Thus far, the only way to ensure that the number of persons watching the program corresponds to the number of persons contained in the license is to physically limit how many persons can perceive the program. For example, only a certain amount of persons are allowed to enter a movie theatre, and the persons that are allowed in are limited to the persons who hold a ticket. The same goes for live sports events or other types of entertainment and educational events. Traditionally, there has been no way to monitor, nor limit the number of persons who watch a program at a remote location, such as a home or office, and thus site licenses have been difficult to enforce in remote locations.

Additionally, many companies refuse to allow individual persons to perceive new releases of programs, such as movie premiers and the like, because there is no way to ensure that only authorized persons will perceive the program.

SUMMARY

The various systems, methods, and embodiments described herein result from the realization that the number of persons who are perceiving a broadcasted program can be checked to see if it coincides with the number of persons in a license, by providing a system and method for determining how many persons are perceiving the program.

Accordingly, the various embodiments and disclosures described herein solve the limitations of the prior art in a new and novel manner.

DETAILED DESCRIPTION OF PREFERRED EMBODIMENTS

System Level Overview

Figure 1A:
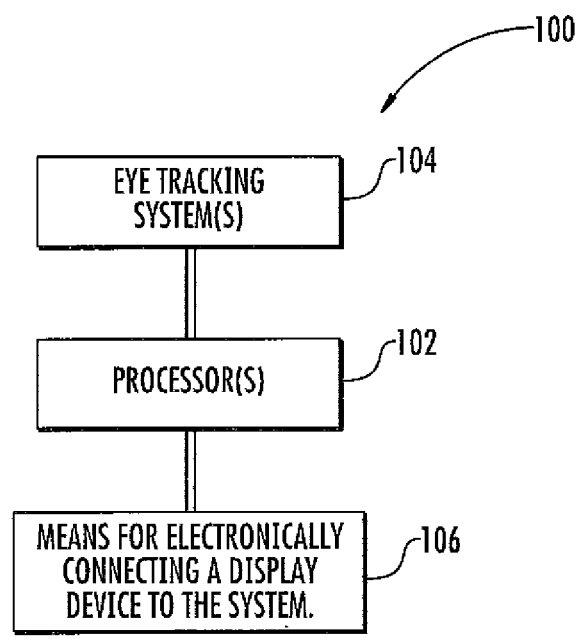
FIGS. 1A through 1D show a system in accordance with various embodiments.

FIGS. 1A through 1D show a system 100 in accordance with some embodiments. In one embodiment, as shown in FIG. 1A, system 100 comprises at least one processor 102, at least one eye tracking system 104, wherein the at least one eye tracking system 104 is electronically connected to at least one processor 102, at least one means for electronically connecting a display device to the system 106, wherein the means for electronically connecting a display device is electronically connected to the at least one processor, and computer executable instructions (not shown) readable by the at least one processor and operative to use at least one eye tracking system 104 to determine a number of persons (shown as 110 in FIG. 1C) that are capable of viewing at least one display device electronically connected to system 100, and control the content (shown as 116 in FIG. 1C) displayed on at least one display device connected to system 100 based on how many persons are determined to be capable of viewing the at least one display device.

Figure 1B:
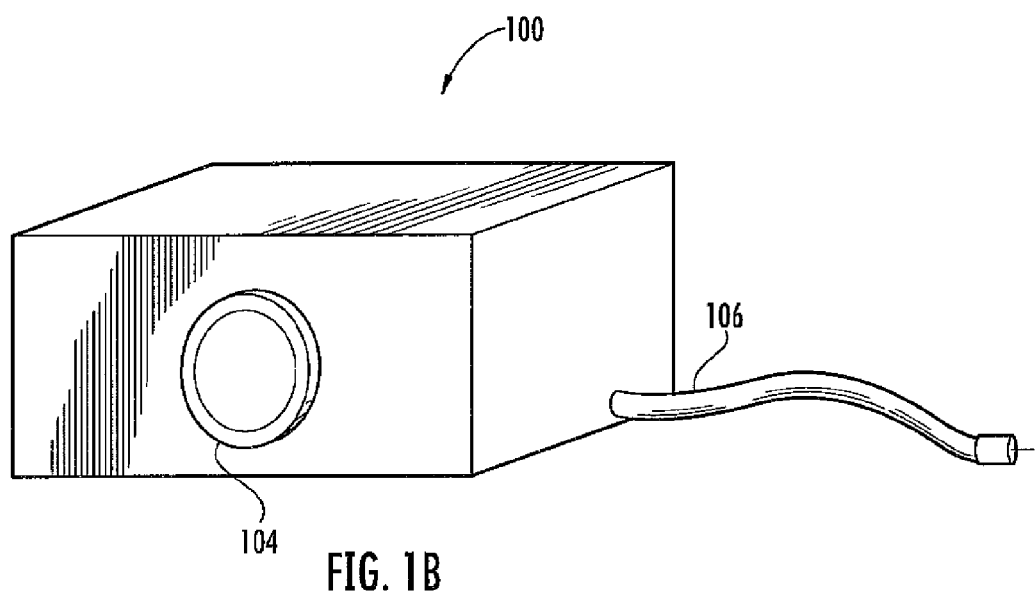
Figure 1C:
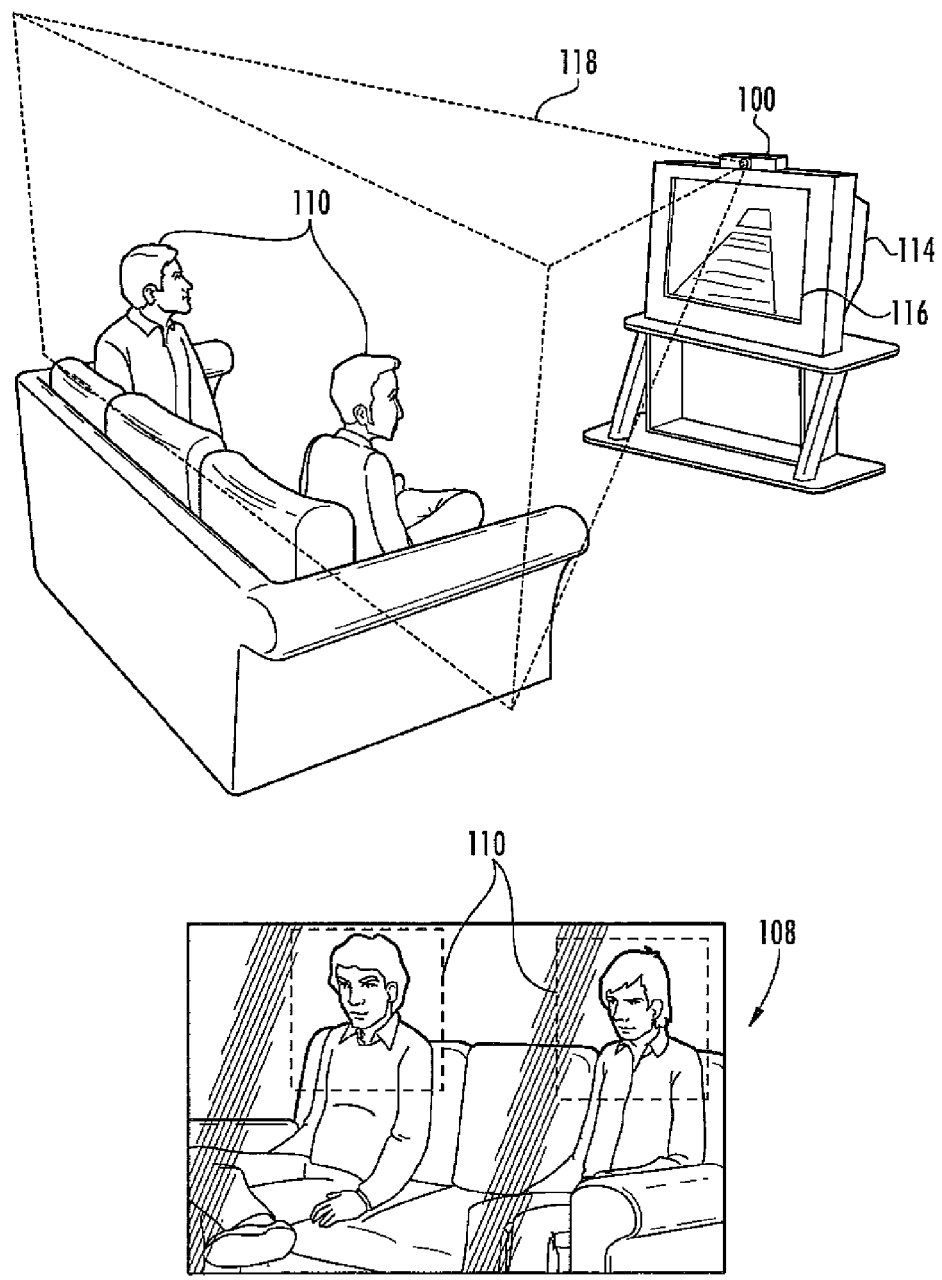

In some embodiments, at least one eye tracking system 104 may be capable of analyzing an image, as shown by reference to numeral 108 in FIG. 1C.

In some embodiments, the at least one processor 102 may be any kind of processor, including, but not limited to, a single core processor, a multi core processor, a video processor, and the like.

At least one eye tracking system 104 may be any eye tracking system, such as, but not limited to, those embodiments described in the publication "Eye Tracking Methodology: Theory and Practice," by Andrew T. Duchowski, Copyright 2007, Published by Springer, ISBN 978-1-84628-608-7, and those eye tracking systems produced by Tobii Technology, Inc., 510 N. Washington Street, Suite 200, Falls Church, Va. 22046, USA (available on the web at http://www.tobii-.com), as well as Smart Eye AB, Första Långgatan 28 B, 413 27 Göteborg, Sweden (available on the web at http://www.s-marteye.se). In some embodiments, at least one eye tracking system 104 may include a field of view 118 that encompasses the same field of view as the display device 114 that may be connected to system 100.

In some embodiments, the at least one means for electronically connecting a display device to the system 106 may be any kind of means, such as a video connector, a coaxial cable, an HDMI cable, an s-video component connector, a WiFi video transceiver, a Bluetooth video transceiver, an internal video cable socket, a DVI connector, and the like. In FIG. 1B, means for electronically connecting a display device to the system 106 is shown to include a cable, but it should be noted that means 106 may include, or may not include a cable. The display device may be any kind of display device, such as, but not limited to, a television, a computer monitor, a projector, or any other kind of screen and/or display device.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions may include image recognition software and/or firmware, which may be used to analyze images captured, and/or information used by at least one eye tracking system 104, and to determine the number of persons present in the image, and consequently in the image capturing means field of view. Such image recognition software may include facial recognition software, or may simply include general object recognition software.

The terms "object recognition software," "facial recognition software," and "image recognition software," as used throughout the present disclosure, may refer to the various embodiments of object recognition software known in the art, including, but not limited to, those embodiments described in the following publications: *Reliable Face Recognition Methods: System Design, Implementation, and Evaluation*, by Harry Wechsler, Copyright 2007, Published by Springer, ISBN-13: 978-0-387-22372-8; *Biometric Technologies and Verification Systems*, by John Vacca, Copyright 2007, Elsevier, Inc., Published by Butterworth-Heinemann, ISBN-13: 978-0-7506-7967-1; and Image Analysis and Recognition, edited by Aurelio Campilho and Mohamed Kamel, Copyright 2008, Published by Springer, ISBN-13: 978-3-540-69811-1, all of which are herein incorporated by reference.

In some embodiments, the computer executable instructions may be further operative to compare the number of persons 110 that are determined to be capable of viewing the at least one display device 114 with a number of persons that are authorized to view the content 116 displayed on the at least one display device 114. In some embodiments, the number of persons that are authorized to view the content may be contained in a license to view the content 116. In other embodiments, the number of persons that are authorized to the view the content 116 may be received from a remote station, such as a television or movie service provider, in communication with system 100. In yet other embodiments, the number of persons that are authorized to view the content 116 may be contained on a piece of media hardware, such as a DVD, CD, and the like.

In a further embodiment, the computer executable instructions may be operative to control the content 116 displayed on the at least one display device 114 if the number of persons 110 determined to be capable of viewing the at least one display device 114 exceeds the number of persons authorized to view the content 116 displayed on the at least one display device 114. In some embodiments, controlling the content 116 displayed on the at least one display device 114 includes, but is not limited to, ceasing to display the content 116, pausing the content 116, playing the content 116, or continuing to display the content 116. In some embodiments, for example, if at the outset of the content's 116 display, the number of persons 110 who are determined to be capable of viewing the at least one display device 114 exceeds the number of persons authorized to watch, the content 116 may not even begin playing. In further embodiments, if the number of persons 110 determined to be capable of viewing the at least one display device 114 at the outset is in accordance with the number of persons authorized to view the content 116, but at a later time exceeds the number authorized, the computer executable instructions may pause, freeze, or cease displaying the content altogether 116. In a further embodiment, if the number of persons determined to be capable of viewing the at least one display device 114 at first exceeds the number authorized, but then later is reduced to or below the number authorized, the computer executable instructions may begin or continue displaying the content 116. The content 116 may be any kind of content, such as, but not limited to, a movie, a television show, a sports broadcast, such as a sports event, news, educational content, and the like.

In a further embodiments, system 100 comprises at least one means for communication with a local device, wherein the means for communicating with the local device is electronically connected to the at least one processor 102. In some embodiments, such means may include a Bluetooth module, a USB port, an infrared port, a network adapter, such as a WiFi card, and the like. The local device may be any kind of device, such as a television, a computer, a remote control, a telephone, a portable digital assistant, and the like.

In yet another embodiment, system 100 further comprises at least one means for communicating with a remote station, wherein the means for communicating is electronically connected to the at least one processor 102. In some embodiments, the means for communicating with a remote station may be any kind of means, such as, but not limited to, a wireless modem, such as a GSM modem, a wired modem, an ethernet adapter, a WiFi adapter, and the like. In some embodiments, the remote station may be a media service provider, such as, but not limited to, a television service provider, a movie provider, a sports media provider, an internet provider, a television station, a server computer, and the like. In such embodiments, the computer executable instructions may be further operative to use the at least one means for communicating with a remote station to receive information from the remote station. The information may include media content, such as television shows, sports broadcasts, movies, and the like. The information may also include how many persons are authorized to view the media content, billing information, and software updates. In some embodiments, a user may use system 100 to select and/or download the media to be viewed, and may select the amount of persons authorized to watch the media.

Figure 1D:
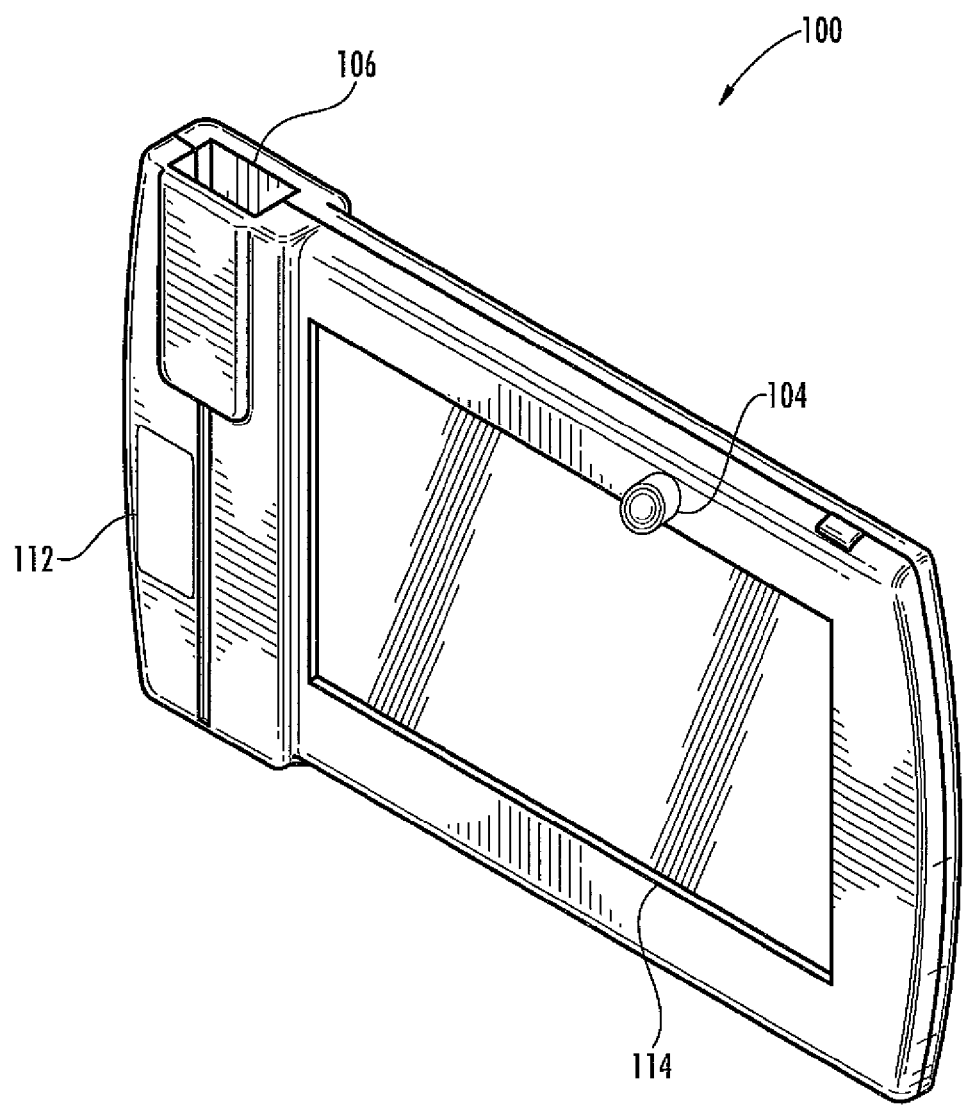

In one embodiment, system 100 may be positioned on or near a display device 114, such as a television or computer monitor (as shown in FIG. 1C). In other embodiments, system 100 may be positioned within, or integrated with a display device 114, such as a television, tablet computer (as shown in FIG. 1D), personal computer, laptop computer, and the like.

In some embodiments, system 100 may further comprise a means for receiving user input, which in some embodiments, may be any type of means, including, but not limited to: a telephone modem: a key pad, a key board, a remote control, a touch screen, a virtual keyboard, a mouse, a stylus, a microphone, a camera, a fingerprint scanner, and a retinal scanner. In a further embodiment, system 100 may include a biometric identification means 112 to identify the person perceiving the content, such as a fingerprint scanner, an eye scanner, and facial recognition software.

Figure 2A:
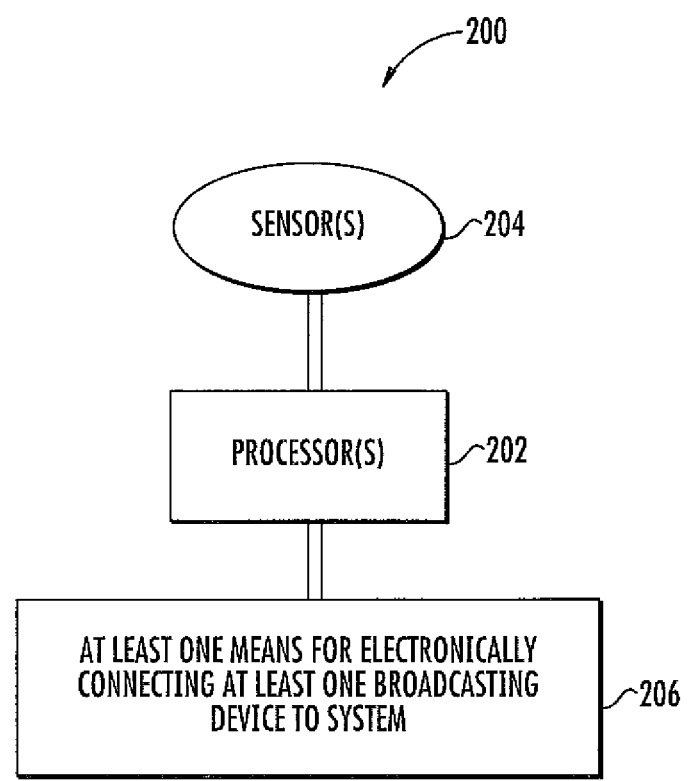
FIGS. 2A through 2D show a system in accordance with various embodiments.
Figure 2B:
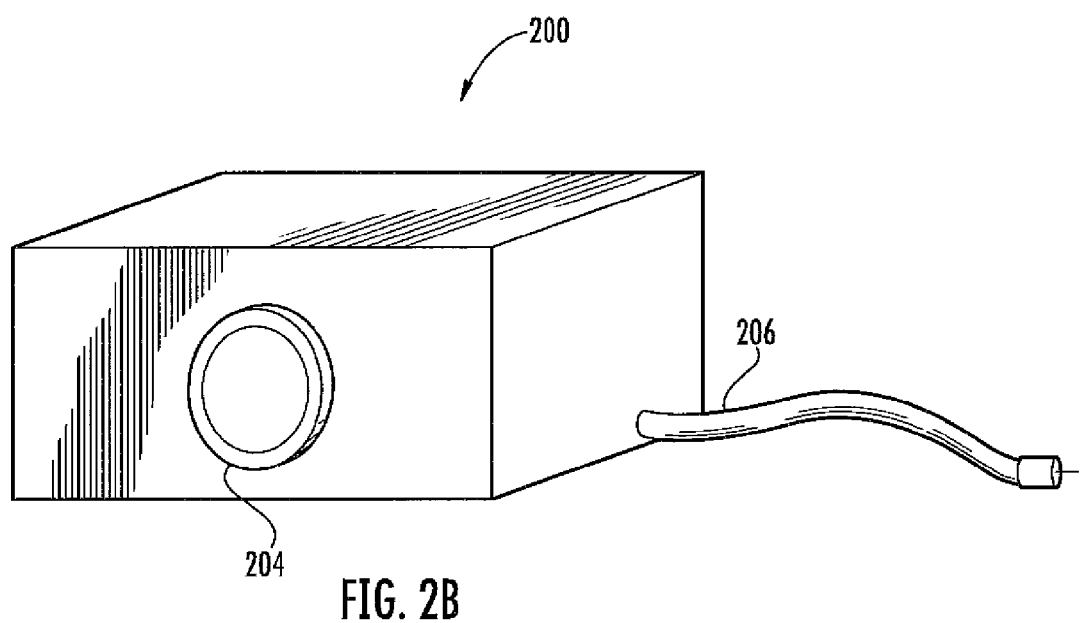

FIGS. 2A through 2D show system 200 in accordance with some embodiments. In one embodiment, as shown in FIG. 2A, system 200 comprises at least one processor 202, at least one sensor 204 electronically connected to at least one processor 202, and at least one means for electronically connecting at least one broadcasting device (shown as 208 in FIG. 2C) to the system 206, wherein the at least one means for electronically connecting at least one broadcasting device 206 is electronically connected to at least one processor 202, and computer executable instructions (not shown) readable by at least one processor 202, and operative to use at least one sensor 204 to determine how many persons (shown as 210 in FIG. 2C) are perceiving a content (shown as 212 in FIG. 1C)

broadcasted through at least one broadcasting device 208 electronically connected to system 200.

In some embodiments, at least one processor 202 may be any kind of processor, including, but not limited to, at single core processor, a multi core processor, a video processor, and the like.

At least one sensor 204 may be any kind of sensor, including, but not limited to, a video sensor, such as a camera, a motion sensor, and the like, an audio sensor, such as a microphone, a tactile sensor, such as a vibration sensor, a chemical sensor, such as an odor sensor, and the like, an electrical sensor, such as a capacitive sensor, a resistive sensor, and the like, and a thermal sensor, such as a heat sensor and/or infrared camera, and the like. In a further embodiment, at least one sensor 204 may be a part of at least one eye tracking system, such as the various embodiments of eye tracking systems described throughout the present disclosure. At least one sensor 204 may be positioned in the same enclosure as at least one processor 202. Alternatively, at least one sensor 204 may be positioned remotely to at least one processor, such as near a couch, or another location.

Figure 2C:
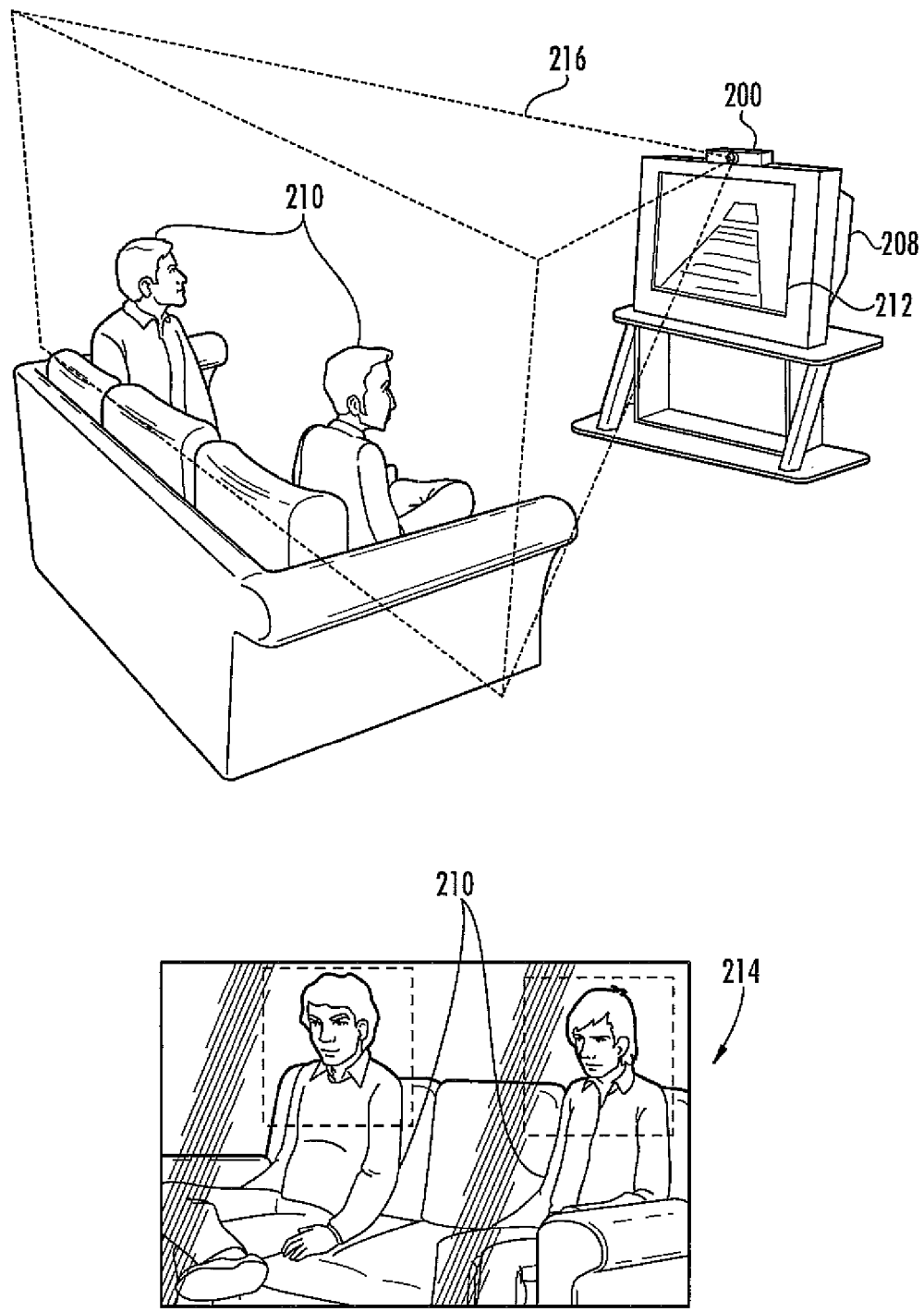

In some embodiments, at least one means for electronically connecting at least one broadcasting device to system 206 may include any such means, such as, but not limited to, an audio connection, such as a speaker connection, and/or a video connection, such as an HDMI, S-Video, or RCA connection, and the like. The broadcasting device 208 may be any kind of broadcasting device, such as a speaker system, headphones, a television (as shown in FIG. 2C), a computer screen, a projector, and the like.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions may include object recognition software, such as image recognition software and/or firmware, which may be used to analyze the information (shown as 214 in FIG. 2C) captured by at least one sensor 204 and to determine the number of persons 210 present in the information 214, and consequently in the at least one sensor's 204 field of sensing 216. Such object recognition software may include image recognition software, which may, in turn, include facial recognition software, or may simply include general visual object recognition software. In another embodiment, the object recognition software may be audio based, being able to distinguish objects (e.g. persons) that are producing certain audio (such as breathing, talking, etc.). In yet a further embodiment, the object recognition software may use a plurality of at least one sensor 204 to determine how many persons are perceiving the content 212.

In some embodiments, the computer executable instructions may be further operative to control content 212 based on how many persons 210 are determined to be perceiving content 212. In a further embodiment, the computer executable instructions may be operative to control the content 212 being broadcasted if the number of persons 210 determined to be perceiving the content 212 exceeds the number of persons authorized to perceive the content. In some embodiments, controlling the content 212 being broadcasted includes, but is not limited to, ceasing to broadcast the content 212, pausing the content 212, playing the content 212, or continuing to display the content 212. In some embodiments, for example, if at the outset of the content's 212 broadcast, the number of persons 210 who are determined to be perceiving exceeds the number of persons 210 authorized to perceive, the content 212 may not even begin being broadcasted. In further embodiments, if the number of persons 210 perceiving the content 212 at the outset is in accordance with the number of persons authorized to perceive the content 212, but at a later time exceeds the number authorized, the computer executable instructions may pause, freeze, or cease broadcasting the content 212 altogether. In a further embodiment, if the number of persons 210 perceiving the content 212 at first exceeds the number authorized, but then later is reduced to or below the number authorized, the computer executable instructions may begin or continue broadcasting the content. The content 212 may be any kind of content, such as, but not limited to, a movie, a television show, a sports broadcast, such as a sports event, news, educational content, a radio show, an audio book, music, a scent, a smell, and the like.

It should be noted that the terms "perceive," "perceiving," "view," and "viewing," are not meant to create the limitation that the persons must be actually perceiving content, but merely that they are capable of perceiving content, such as by being in the same room as where the content is being played.

In a further embodiments, system 200 comprises at least one means for communication with a local device, wherein the means for communicating with the local device is electronically connected to the at least one processor 202. In some embodiments, such means may include a Bluetooth module, a USB port, an infrared port, a network adapter, such as a WiFi card, and the like. The local device may be any kind of device, such as a television, a computer, a remote control, a telephone, a portable digital assistant, and the like.

In yet another embodiment, system 200 further comprises at least one means for communicating with a remote station, wherein the means for communicating is electronically connected to the at least one processor 202. In some embodiments, the means for communicating with a remote station may be any kind of means, such as, but not limited to, a wireless modem, such as a GSM modem, a wired modem, an ethernet adapter, a WiFi adapter, and the like. In some embodiments, the remote station may be a media service provider, such as, but not limited to, a television service provider, a movie provider, a sports media provider, a radio station, an internet provider, a television station, a server computer, and the like. In such embodiments, the computer executable instructions may be further operative to use the at least one means for communicating with a remote station to receive information from the remote station. The information may include media content, such as television shows, sports broadcasts, movies, music, radio shows, smells, scents, and the like. The information may also include how many persons are authorized to view the media content, viewer content, billing information, and software updates. In some embodiments, a user may use system 200 to select and/or download the media to be viewed, and may select the amount of persons authorized to watch the media.

Figure 2D:
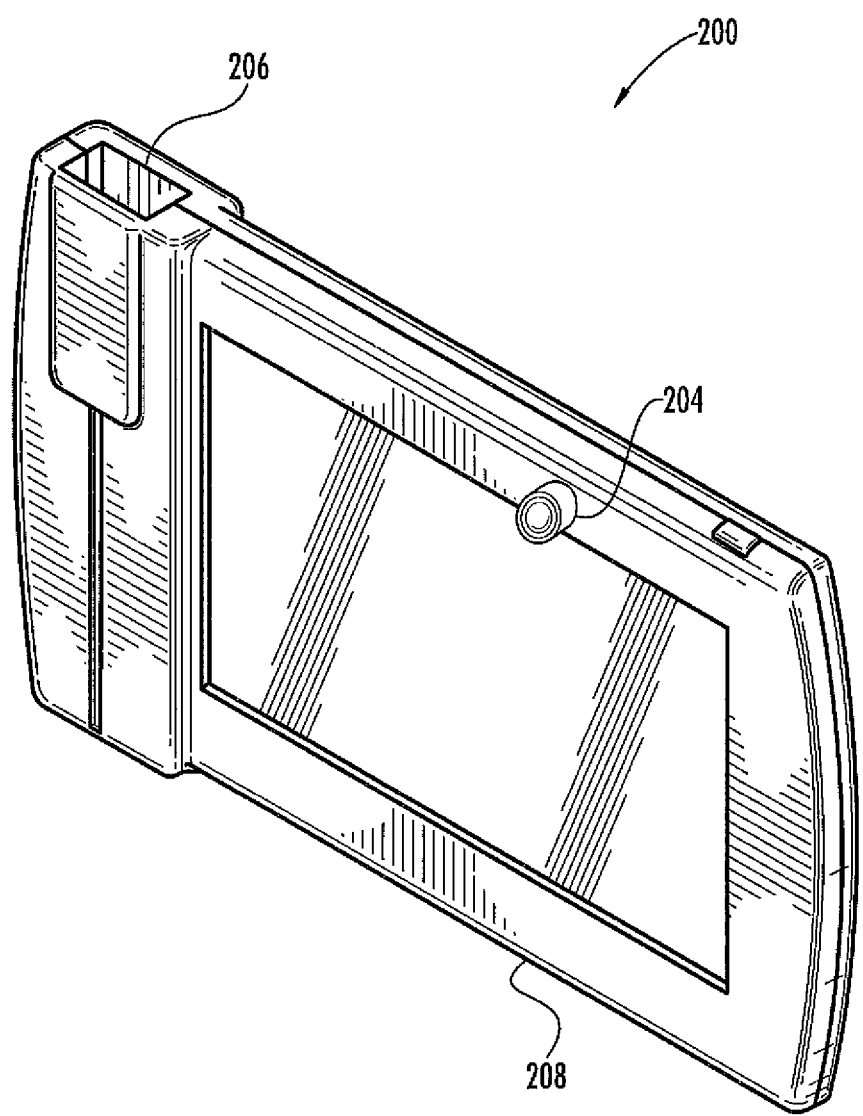

In one embodiment, system 200 may be positioned on or near a display device, such as a television or computer monitor (as shown in FIG. 2C). In other embodiments, system 200 may be positioned within, or integrated with a broadcasting device, such as a television, tablet computer (as shown in FIG. 2D), personal computer, laptop computer, radio, smell producer, and the like.

Figure 3:
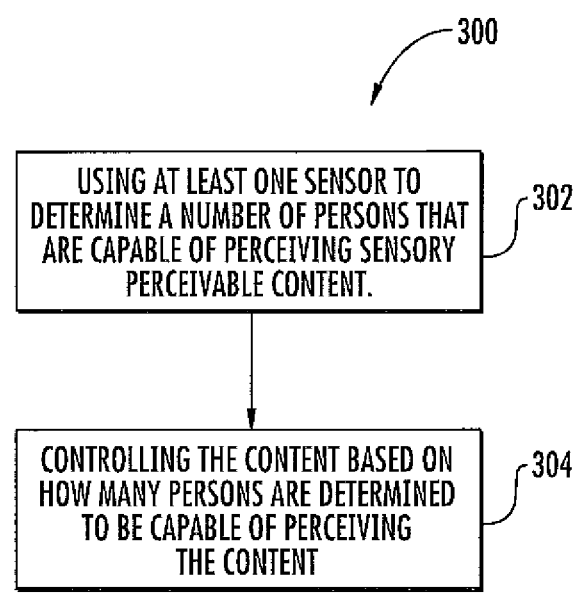
FIG. 3 shows a flow diagram representing a method in accordance with one embodiment.

FIG. 3 shows a flow diagram representing an embodiment of method 300, wherein method 300 comprises using at least one processor to perform any or all of the following: using at least one sensor to determine the number of persons that are capable of perceiving sensory perceivable content (block 302), and controlling the content based on how many persons are determined to be capable of perceiving the content (block 304).

In some embodiments, the sensor may be any kind of sensor, including, but not limited to, a visual sensor, an audio sensor, a tactile sensor, a thermal sensor, an eye tracking sensor, a chemical sensor, an electrical sensor, a capacitive sensor, a resistive sensor, a camera, a thermal imaging camera, a microphone, any other type of sensor described herein, and the like.

In some embodiments, the sensory perceivable content may be audio content, such as music, dialogue, and the like, and/or visual content, such as images, text, movies, television shows, sports events, and the like. Alternatively, the content may be internet service. In some embodiments, the content may be tactile content, like vibrations or force feedback, while in other embodiments, the content may be perceived with the nose, such as smells, scents, and the like.

In a further embodiment, using at least one sensor to determine an umber of persons that are capable of perceiving sensory perceivable content comprises using at least one eye tracking system to determine a number of persons that are capable of perceiving sensory perceivable content.

In a further embodiment of method 300, controlling the content based on how many persons are determined to be perceiving the content comprises any or all of the following: pausing the content when the number of persons determined to be perceiving the content exceeds a number of persons authorized to perceive the content, playing the content when the number of persons determined to be perceiving the content is equal or less to the number of persons authorized to perceive the content, and ceasing the content when the number of persons determined to be perceiving the content exceeds the number of persons authorized to perceive the content.

In a further embodiment, method 300 comprises any or all of the following steps: allowing at least one user to register for at least one broadcast of at least one program, using at least one image recording means to capture at least one image of the at least one user, and using at least one processor to analyze the image and determine how many users are in the image, and begin, continue, or cease broadcasting or displaying the program based on how many users are determined to be in the image. In some embodiments, method 300 further comprises using at least one processor to begin broadcasting the program if the amount of users determined to be in the image corresponds to the amount of users registered for the broadcast.

In some embodiments, method 300 further comprises using at least one processor to continue broadcasting the program if the amount users determined to be in the image corresponds to the amount of users registered for the broadcast.

In some embodiments, method 300 further comprises using at least one processor to cease broadcasting the program if the amount users determined to be in the image does not correspond to the amount of users registered for the broadcast.

In some embodiments, method 300 further comprises using at least one processor to carry out any of the aforementioned steps, or any other steps described in the present disclosure.

In some embodiments, method 300 may be implemented as a computer readable medium having computer executable instructions. The term "computer readable medium," as used throughout this disclosure, may refer to any computer readable medium, such as CD-ROMs, CD-Rs, CD-RWs, floppy disks, hard drives, flash drives, diskettes, solid state drives, tape drives, and any other form of computer readable medium.

In some embodiments method 300 may be integrated wholly, or in part, into systems 100 and 200 described above, as well as other systems and methods described throughout the present disclosure. In some embodiments, method 300 may be carried out using the various systems described throughout the present disclosure.

Hardware and Operating Environment

This section provides an overview of example hardware and the operating environments in conjunction with which embodiments of the inventive subject matter can be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 6 below.

Figure 4:
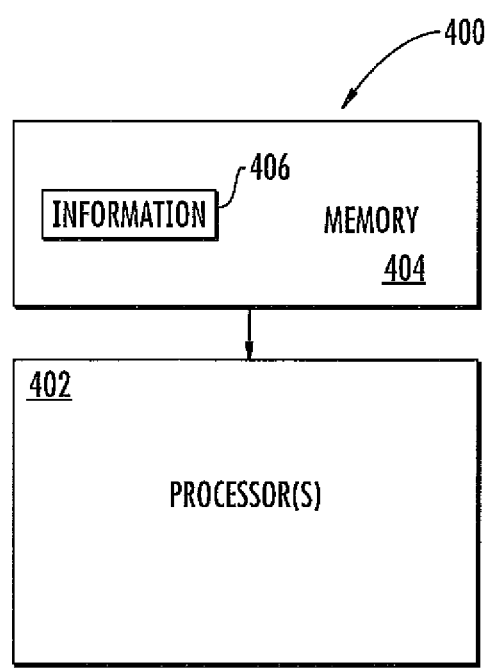
FIG. 4 shows an article in accordance with one embodiment.

FIG. 4 is a block diagram representing an article according to various embodiments. Such embodiments may comprise a computer, a memory system, a magnetic or optical disk, some other storage device, or any type of electronic device or system. The article 400 may include one or more processor(s) 402 coupled to a machine-accessible medium such as a memory 404 (e.g., a memory including electrical, optical, or electromagnetic elements). The medium may contain associated information 406 (e.g., computer program instructions, data, or both) which, when accessed, results in a machine (e.g., the processor(s) 402) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
   a. at least one processor;
   b. at least one eye tracking system electronically connected to the at least one processor;
   c. at least one display device electronically connected to the at least one processor and operative to display content, wherein the content is associated with at least one license comprising a number of persons authorized to view the content; and
   d. computer executable instructions readable by the least one processor and configured to:
      i. use the at least one eye tracking system to determine a number of persons that are capable of viewing the at least one display device;
      ii. compare the number of persons that are determined to be capable of viewing the at least one display device with the number of persons that are authorized to view the content; and
      iii. control the content based on how many persons are determined to be capable of viewing the at least one display device wherein controlling the content comprises:
         1. refusing to play, ceasing to play, or pausing the content when the number of persons determined to be capable of viewing the content is greater than the number of persons authorized to view the content; and
         2. playing the content when the number of persons determined to be capable of viewing the content is equal to or less than the number of persons authorized to view the content; and
      iv. allow at least one user to obtain at least one new license or alter the at least one license if the number of persons determined to be capable of viewing the at least one display device is not equal to the number of persons authorized to view the content.

2. The system of claim 1, wherein the computer executable instructions are configured to receive the number of persons authorized to view the content from a remote station or from a computer readable medium.

3. The system of claim 1, wherein the computer executable instructions are configured to allow at least one user to obtain at least one new license or alter the at least one license if the number of persons determined to be capable of viewing the at least one display device is less than the number of persons authorized to view the content.

4. The system of claim 1, wherein the computer executable instructions are configured to allow at least one user to obtain at least one new license or alter the at least one license if the number of persons determined to be capable of viewing the at least one display device is greater than the number of persons authorized to view the content.

5. The system of claim 1, further comprising at least one local communications device connected to the at least one processor.

6. The system of claim 1, further comprising at least one remote communications device connected to the at least one processor.

7. The system of claim 6, wherein the computer executable instructions are configured to use the remote communications device to transmit or receive information to or from a remote station.

8. The system of claim 7, wherein the information comprises any or all of the following types of information: viewer content, the number of persons authorized to view the content, billing information, at least one license associated with the content, and software updates.

9. A method comprising using at least one processor to perform any or all of the following:
   a. using at least one sensor to determine a number of persons that are capable of perceiving sensory perceivable content, wherein the sensory perceivable content is associated with at least one license comprising a number of persons authorized to perceive the sensory perceivable content;
   b. comparing the number of persons that are determined to be capable of perceiving the sensory perceivable content with the number of persons authorized to perceive the sensory perceivable content;
   c. controlling the sensory perceivable content based on how many persons are determined to be capable of perceiving the sensory perceivable content, wherein controlling the sensory perceivable content comprises:
      i. refusing to play, ceasing to play, or pausing the sensory perceivable content when the number of persons determined to be capable of perceiving the sensory perceivable content is greater than the number of persons authorized to perceive the sensory perceivable content in the at least one license; and
      ii. playing the sensory perceivable content when the number of persons determined to be capable of perceiving the sensory perceivable content is equal to or less than the number of persons authorized to perceive the sensory perceivable content in the at least one license; and
   d. allowing at least one user to obtain at least one new license or alter the at least one license if the number of persons determined to be capable of perceiving the sensory perceivable content does not equal the number of persons authorized to perceive the sensory perceivable content.

10. The method of claim 9, wherein, the at least one sensor is a type of sensor selected from the group consisting essentially of: a visual sensor, an eye tracking sensor, an audio sensor, a tactile sensor, a thermal sensor, a chemical sensor, an electrical sensor, a capacitive sensor, a resistive sensor, a camera, a thermal imagining camera, and a microphone.

11. The method of claim 9, wherein the sensory perceivable content comprises audio or visual content.

12. The method of claim 9, further comprising allowing at least one user to obtain at least one new license or alter the at least one license if the number of persons determined to be capable of perceiving the sensory perceivable content is less than the number of persons authorized to perceive the sensory perceivable content.

13. The method of claim 9, further comprising allowing at least one user to obtain at least one new license or alter the at least one license if the number of persons determined to be capable of perceiving the sensory perceivable content is greater than the number of persons authorized to perceive the sensory perceivable content.

14. A non-transitory computer readable medium having computer executable instructions for performing a method comprising:
   a. using at least one eye tracking system to determine a number of persons that are capable of perceiving sensory perceivable content, wherein the sensory perceivable content is associated with at least one license comprising a number of persons authorized to perceive the sensory perceivable content;
   b. comparing the number of persons that are determined to be capable of perceiving the sensory perceivable content with the number of persons that are authorized to perceive the sensory perceivable content;

c. controlling the sensory perceivable content based on how many persons are determined to be capable of perceiving the sensory perceivable content wherein controlling the sensory perceivable content comprises:
   i. refusing to play, ceasing to play, or pausing the sensory perceivable content when the number of persons determined to be capable of perceiving the sensory perceivable content is greater than the number of persons authorized to perceive the sensory perceivable content; and
   ii. playing the sensory perceivable content when the number of persons determined to be capable of perceiving the sensory perceivable content is equal to or less than the number of persons authorized to perceive the sensory perceivable content; and
d. allowing at least one user to obtain at least one new license or alter the at least one license if the number of persons determined to be capable of perceiving the sensory perceivable content does not equal the number of persons authorized to perceive the sensory perceivable content.

15. The non-transitory computer readable medium of claim 14, wherein the computer executable instructions are configured to receive the number of persons authorized to perceive the sensory perceivable content from a remote station or from a computer readable medium.

16. The non-transitory computer readable medium of claim 15, wherein the computer executable instructions are configured to allow at least one user to obtain at least one new license or alter the at least one license if the number of persons determined to be capable of perceiving the sensory perceivable content is less than or greater than the number of persons authorized to perceive the sensory perceivable content.

17. The non-transitory computer readable medium of claim 14, wherein the computer executable instructions are configured to use at least one remote communications device to transmit or receive information to or from at least one remote station.

18. The non-transitory computer readable medium of claim 14, wherein the computer executable instructions are configured to allow at least one user to select or download sensory perceivable content or the number of persons authorized to perceive the sensory perceivable content.

19. The method of claim 9, further comprising allowing at least one user to select or download content or the number of persons authorized to perceive the sensory perceivable content.

20. The system of claim 1, wherein the computer executable instructions are configured to allow at least one user to select or download content or the number of persons authorized to view the content.

* * * * *